United States Patent [19]

Doebel

[11] 4,235,225
[45] Nov. 25, 1980

[54] SEMI-TUBULAR PARABOLIC MULTIPLE CORE HELIX SOLAR CONCENTRATOR

[76] Inventor: David H. Doebel, 17745 Fruitport Rd., Spring Lake, Mich. 49456

[21] Appl. No.: 14,956

[22] Filed: Feb. 26, 1979

[51] Int. Cl.³ .......................... F24J 3/02; H01L 31/00
[52] U.S. Cl. .................................. 126/438; 126/441; 136/246
[58] Field of Search ............... 126/450, 424, 438, 439, 126/441, 417; 136/89 PC

[56] References Cited

U.S. PATENT DOCUMENTS

| | | | |
|---|---|---|---|
| 3,006,818 | 10/1961 | Lappala et al. | 126/450 |
| 3,985,119 | 10/1976 | Oakes | 126/438 |
| 3,990,430 | 11/1976 | Robertson | 126/438 |
| 4,015,584 | 4/1977 | Haberman | 126/438 |
| 4,038,964 | 8/1977 | Drew | 126/438 |
| 4,080,221 | 3/1978 | Manelas | 126/438 |
| 4,098,264 | 7/1978 | Brokaw | 126/425 |
| 4,099,516 | 7/1978 | Caulier | 126/438 |
| 4,138,994 | 2/1979 | Shipley | 126/438 |
| 4,149,525 | 4/1979 | Prado | 126/450 |
| 4,153,039 | 5/1979 | Carroll | 126/438 |

*Primary Examiner*—James C. Yeung
*Assistant Examiner*—Daniel O'Connor

[57] ABSTRACT

A device for improving the radiant solar energy collection efficiency of a helix shaped solar collector-concentrator by concentrating the sun's rays on a plurality of specifically positioned energy absorber collecting cores as the sun moves through its solar day without the use of active tracking devices, is provided. By using a helix shaped semi-tubular parabolic collector-concentrator with multiple specifically positioned collecting cores crossing and intersecting the shifting sharp focal axis of the reflective surfaces of the helix shape at a slight angle to the focal axis, rather than being exactly on the focal axis, at least one or more of the collecting core surfaces is in sharp focus at all times, thus optimizing the sun's radiant solar energy collection capacity of said device. Further increased primary direct and non-reflective incident solar energy is collected on a plurality of collecting cores providing additional collection efficiencies. The helix shaped semi-tubular parabolic reflector and the energy absorber cores are enclosed by a transparent, relatively air-tight covering which causes the device to be resistant to environmental factors such as snow, rain, wind, pollution and other atmospheric degradants. The additional confined heat energy generated and trapped within the covered helix shaped semi-tubular parabolic reflector further increases the device's collecting efficiency. In one embodiment the heat energy thus collected may be transferred to a heat absorbing medium to be utilized in a useful manner. In another embodiment the solar energy impinging on the energy absorber collecting cores may be converted by other means such as photoelectric conversion into electrical energy to be utilized and stored.

9 Claims, 10 Drawing Figures

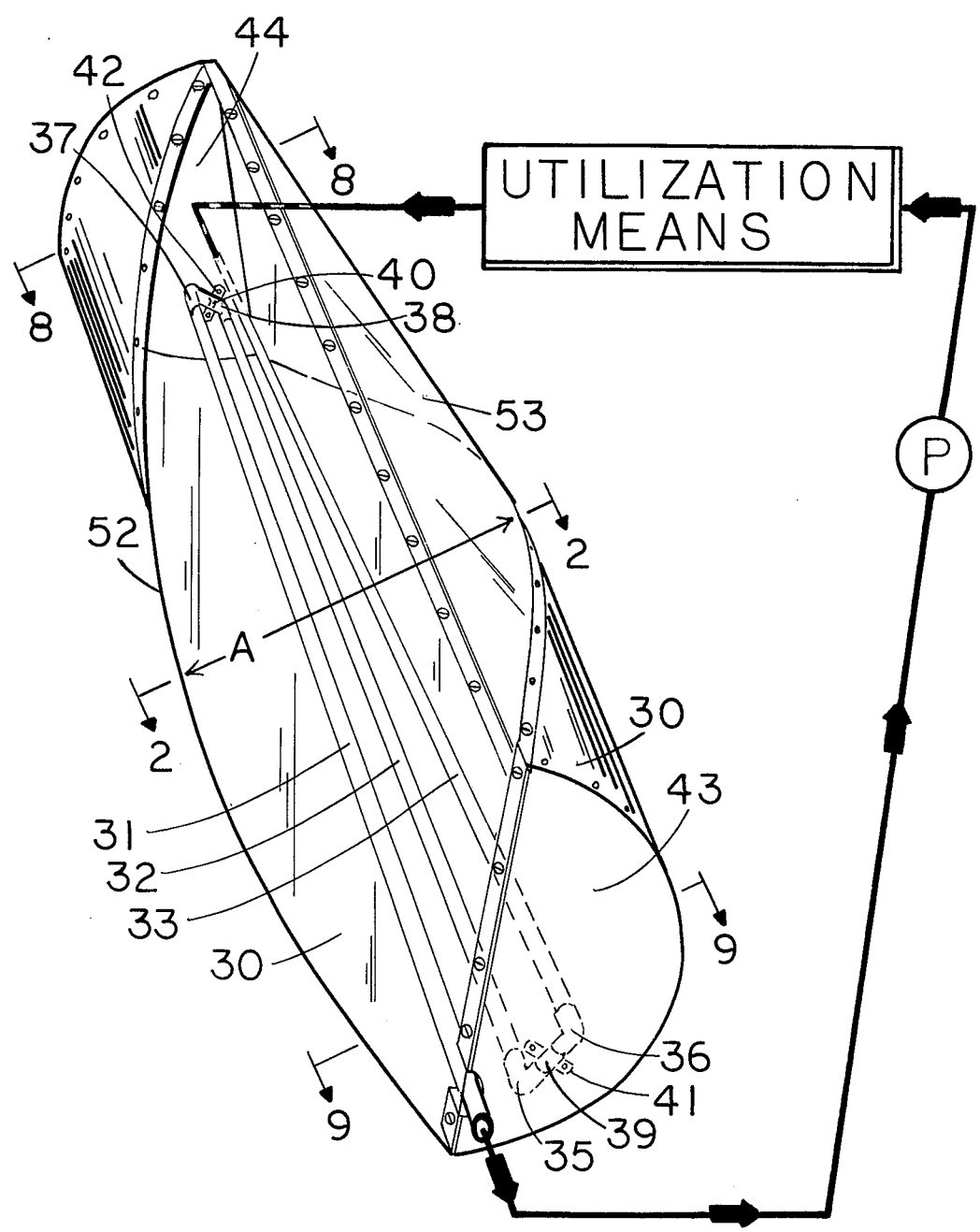

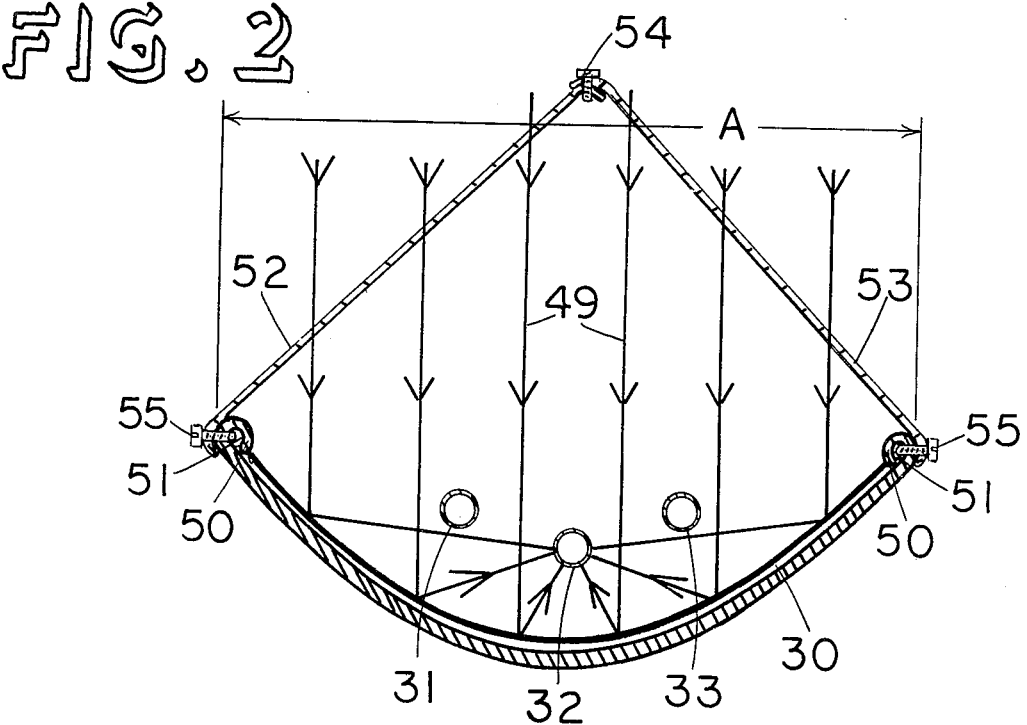
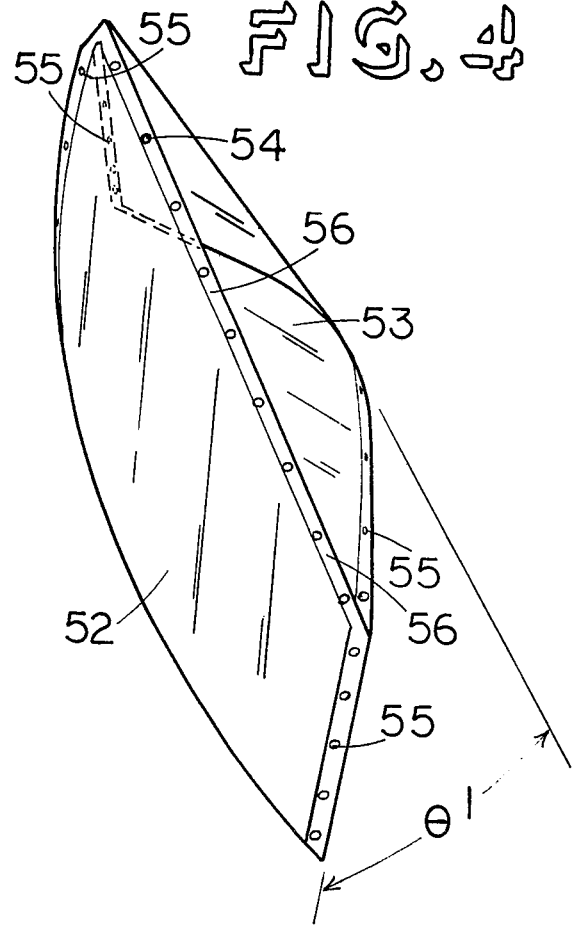
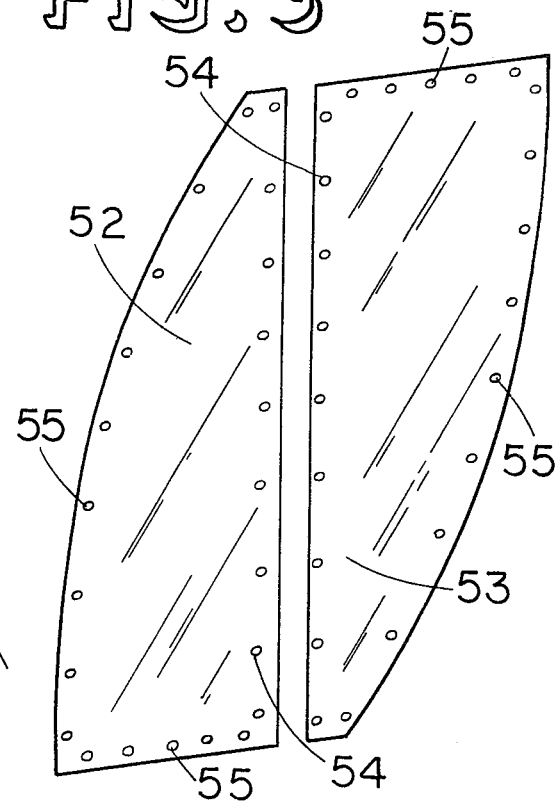

SEMI-TUBULAR PARABOLIC MULTIPLE CORE HELIX SOLAR CONCENTRATOR

BACKGROUND OF THE INVENTION

Helix shaped concentrators as outlined in prior art are basically composed of a passive tracking helix shaped semi-tubular reflector which has been spiraled as much as 360 degrees in the form of a helix so as to always expose at least some part of the reflective surface of the sun in order to concentrate radiant solar energy onto an energy absorber collecting core. Such a helix shaped collector-concentrator is described in a concave form in a prior U.S. patent application for a CONCAVE HELIX SOLAR CONCENTRATOR, Ser. No. 934,833, filed Aug. 18, 1978, and in a U.S. disclosure document for a CONCAVE HELIX SOLAR CONCENTRATOR, Ser. No. 072,971, filed July 25, 1978. Such a concentrator as described therein depends upon one core as shown in FIG. 1 of the Ser. No. 934,833 patent application and FIG. 1 of the Ser. No. 072,971 disclosure document. Since the single core is in the exact focal point of the concentrator at all times, only a small area of the collector core is in sharp focus at a particular position of the sun in the sky. The efficiency of the concentrator is lowered because of the small area of sharp focus of the sun's solar energy, additionally primary direct, reflective and non-reflective incident solar energy are not utilized to the fullest degree because of the inherent limitation of only one collecting core.

Further, because of a lack of a covering for both the reflector and collecting core, energy is lost by heat dissipation to the environment. If a wind blows, it also institutes a cooling effect on the collecting cores and on the reflector depending upon the chill factor of the wind and the surrounding temperature of the atmosphere.

In addition, an uncovered helix shaped reflector tends to collect ice and snow in those climates with heavy winter precipitation, especially detrimental to solar energy collection when the sun is obscured during the day by cloud formation. This lack of covering may also leave the reflector and energy absorber collecting cores prone to deterioration by exposure to atmospheric pollutants that exist to some degree and variation in all parts of the world.

Whereas a simple concave configuration to a helix shaped reflector does not make fully efficient use of the reflective surface to concentrate the sun's rays on a central core, a different, more effective compound geometric shape is needed for an efficient helix reflector.

It is therefore an object of this invention to increase radiant solar energy collection of a helix shaped concentrator by providing a plurality of specifically positioned of energy absorber collecting cores exposed to primary direct incidence of the sun's rays, as well as to reflective and non-reflective incident energy collection.

Another object of this invention is to improve the thermal heat energy collecting efficiency of single or multiple energy absorber collecting core helix shaped concentrators by additional means, such as providing a means of covering the helix shaped collector-concentrator with a transparent, relatively air-tight enclosure which is resistant to environmental factors such as snow, wind, rain and atmospheric pollutant degradation. A further object of this invention, through the utilization of the aforementioned transparent, relatively air-tight covering is to increase the energy collection within the energy absorber collecting cores, by trapping and confining the heat energy generated within the helix shaped concentrator and immunizing the helix shaped reflector and its attendant energy absorber collecting core or cores from wind chill and heat dissipation. A further object of this invention is to provide a more effective geometric shape for the helix concentrator's reflective surface besides being simply helix shaped and concave in form.

SUMMARY OF THE INVENTION

With the foregoing in mind, the present invention provides a way of increasing the thermal energy collection efficiency of single and multiple core helix shaped concentrators by specifically placing the energy absorber collecting core or cores across and intersecting the shifting sharp focal axis of the reflector at a slight angle, rather than being exactly on it, thus permitting the sun's rays to be in focus on a much larger area of the collecting cores.

Further, because of the slight off the focal axis angle of the cores, the solar axis of focus actually rotates or partially wraps itself around the particular cores that are in sharp focus, when they are spherical in nature. More particularly, as the sun moves, the focal axis shifts sequentially from core to core.

Each of the cores is so positioned to be in sharp focus at a slight off-angle during some part of each solar day, thus optimizing the thermal energy collection from the sun's rays by the helix shaped concentrator without the use of active tracking devices. In other words, the cores as defined herein passively serve the primary function of a movable core or reflector in order to optimally utilize a sharply defined focal axis. The slight shadows cast by each energy absorber collecting core are minimal and do not adversely affect the reflector's collection capacity.

Specifically, the present invention provides a specially configured transparent covering, designed to cover the upper surface of the helix shaped collector-concentrator, which is resistant to snow build-up due to its inherent extreme incline, while at the same time making the helix shaped reflector and energy absorber collecting cores resistant to deterioration caused by wind, rain, and atmospheric pollutant contamination. More particularly, the invention's aforementioned transparent, relatively air-tight covering provides higher thermal energy collection efficiencies by restricting the heat energy generated by primary direct incidence of the sun's rays, as well as the reflective and non-reflective incidence and ambient heat energy, to the confines of the helix shaped reflector and its attendant energy absorber collecting cores so as to inhibit dissipation of the heat energy to the outer atmosphere.

The geometric arrangement of the invention's helix shaped reflector takes the form of a semi-tubular concave-parabolic reflector which has been spiraled as much as 360 degrees in the form of a helix which has the advantage of automatically tracking the sun's trajectory across the sky without the use of active tracking devices.

Further, the helix shape is concave at opposite ends and parabolic in the middle, resulting in improved concentration capacity of the sun's radiant energy due to the combined concave and parabolic structure of the helix.

The present invention provides a novel collector structure which utilizes a plurality of collection cores joined together and so specifically positioned across and intersecting the shifting sharp focal axis of the helix reflector so as to take advantage of increased reflective solar radiation impinging on the helix reflector. The energy absorber collecting cores in one embodiment of the invention utilize a heat transfer liquid or gas such as water or steam piped through the cores. The heat energy is then pumped by a pump to a utilization means such as a steam turbine for power generation or the heat energy may also be used for refrigeration, air-conditioning, house or building heating, swimming pool and hot water heating, or any other heat energy use.

In another embodiment, the collecting cores take the form of photovoltaic cells that permit the collection of electrical energy by photoelectric conversion. The utilization means may be in the form of batteries, DC motors, and DC to AC converters, or any other electrical or electronic use.

These and other objects of the present invention will become more apparent from the following description and drawings set forth hereinafter:

BRIEF DESCRIPTION OF THE DRAWINGS

FIG. 1 is a perspective view taken from the left side and slightly above showing one embodiment of a novel solar helix shaped concentrator.

FIG. 2 is a sectional view taken along lines 2—2 of FIG. 1 showing the parabolic form of the helix shaped concentrator and also illustrates the form of the transparent, relatively air-tight covering of the device.

FIG. 3 is a top view of a pattern used for cutting the transparent covering of the device.

FIG. 4 is a perspective view of the transparent covering of the device.

DESCRIPTION OF THE PREFERRED EMBODIMENTS

Figure 5:
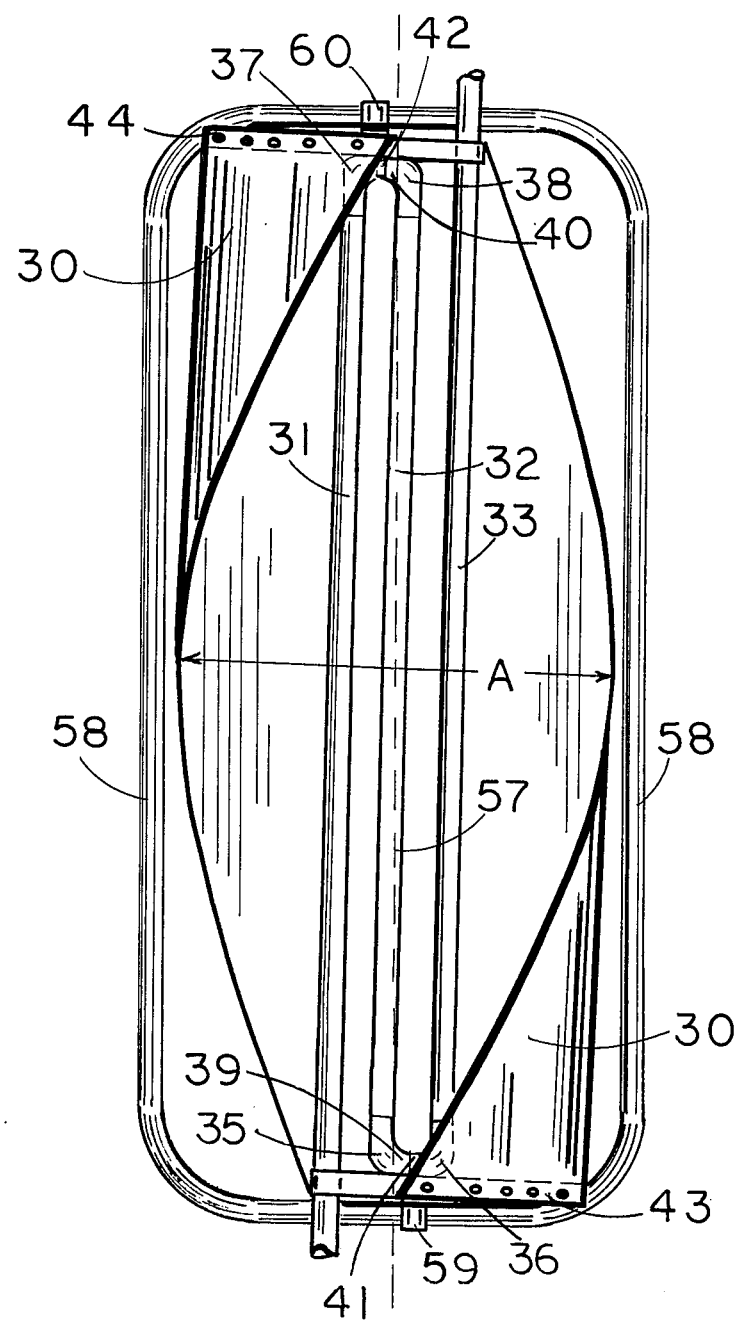
FIG. 5 is a top view of a helix concentrator illustrating the collecting cores and showing one focal axis plain at mid-day of the device and an improved mounting frame.

Referring to the drawings and particularly FIG. 1 the improvements in the helix shaped concentrator can be readily seen. The semi-tubular helix shaped parabolic concentrator with up to a 360 degree spiral, consists of a combination concave and parabolic reflector 30 with aperture A open up to 179 degrees of the sun's solar energy and with the purpose of passively concentrating without optoelectrical-mechanical tracking devices, the sun's solar energy rays on a plurality of specifically positioned cores 31, 32, and 33 respectively as the sun travels through its solar day. Seasonal north-south inclination of reflector 30 may be fixed at a compromise angle of tilt according to the latitude in which it is installed, or reflector 30 may be seasonally tilted by adjustable means in order to optimize the reflector's 30 solar collection capacity. The plurality of cores made of copper, brass, aluminum, steel, or other appropriate material 31, 32, and 33 are soldered, welded, or cemented to 90 degree elbows 35, 36, 37, and 38 with a short section of tubing 39 and 40. The core units, or the entire combination of 35, 39, and 36, plus 37, 40, and 38 may be eliminated in favor of a contiguous "U" bend (in plumbing jargon called a "return bend") in a section of tubing, again being attached in the aforementioned manner to 31, 32, and 33 respectively. Short pipes 39 and 40 or return bends are attached by clamps 41 and 42 which in turn are attached by fasteners to end pieces 43 and 44 which are shaped and placed in one form of opposed half circles and are composed of waterproofed material such as wood or particle board. Cores 31 and 33 exit through a hole near the edge of end pieces 43 and 44 and are the size of the cores 31 and 33 respectively. End pieces 43 and 44 are canted slightly and opened outward from their absolute parallel opposition which opens aperture A to a max. 179 degrees so as to provide a greater acceptance of solar radiant energy impinging on reflector 30 and further contributes to the formation of a parabolic shape to the center portion of the reflector 30. If the end pieces 43 and 44 are parabolic in shape, the entire reflector 30 will be fabricated in a helix shaped parabolic form and the entire reflector's acceptance angle of solar energy is increased. The plurality of cores 31, 32, and 33 may be in parallel, side by side, or in series, following one another, or continuously formed, or in any other acceptable configuration. If the cores 31, 32, and 33, which are painted heat absorbing black, are placed in series, the heat energy generated throughout the cores will be additional and may be as high as 500 degrees or more. The cores 31, 32, and 33 may be hollow, thus allowing a heat transfer medium to be circulated by pump P through appropriate plumbing to a utilization means, such as a steam turbine, hot water heater, refrigeration system, swimming pool, building heater, or any other solar heat energy usage.

The energy absorber collecting cores 31, 32, and 33 may in a second embodiment of the invention, be composed of photovoltaic cells 34 (FIG. 10) in which case they produce electrical energy by a process of photoelectric conversion. The electrical energy may be utilized by the utilization means which can take the form of a battery, DC motor, DC to AC convertor, incandescant lamps or any other means of electrical or electronic utilization with the plumbing being replaced with electrical conductors.

The means of construction for the helix shaped reflector 30 and its various parts and method of assembly and attachment may be according to the method found in U.S. patent application for CONCAVE HELIX SOLAR CONCENTRATOR, Ser. No. 934,833 filed Aug. 18, 1978 and in U.S. disclosure document for CONCAVE HELIX SOLAR CONCENTRATOR, Ser. No. 072,971, filed July 25, 1978, or any other method of fabricating a helix solar concentrator.

Referring to FIG. 2 there is shown a transverse cross section taken at mid-point along lines 2—2 of FIG. 1 indicating the parabolic shape of the reflector 30 which has been segmented to show a method of construction. The plurality of cores 31, 32, and 33 are specifically positioned sequentially (one following the other) to fall within the sharp focal axis at a slight off-angle depenedent upon the position of the sun in the sky. The sun's rays 49 reflect off the reflector 30 and impinge on the collecting cores 31, 32, and 33 respectively. If the sun is at mid-day position as illustrated by FIG. 2 the reflector's 30 focal axis will fall on core 32 with non-reflective incident (ambient) heat energy falling on cores 31, 32, and 33. Primary direct incident radiation of the sun's rays will fall on all three cores 31, 32, and 33 at mid-day as they are within the primary direct acceptance aperture A of reflector 30. The primary direct and nonreflective incident solar radiant energy can raise the core 31, 32, and 33 temperatures to as much as 150 degrees or higher without the reflected solar energy.

The inwardly rolled edge 50 with its integral stiffener rod 51 serves as an anchor member for the transparent covering 52 and 53 which may be formed of glass or other suitable material or be heat, pressure and vacuum formed in two halves of clear plastic such as "Lucite" acrylic sheet or "Lexan" polycarbonate sheet. The acrylic sheet has a service temperature of 140 to 200 degrees Fahrenheit with good impact strength—0.4 to 2 foot-pounds per inch; optical clarity; weather resistant; tough at low temperatures, while the polycarbonate boasts a service temperature of 250 degrees Fahrenheit with good impact strength—16 foot-pounds per inch; is quite rigid and transparent. The covering halves 52 and 53 are overlapped and attached at the top by fasteners 54 or are solvent welded and at the sides of the helix 30 by additional fasteners 55 attached to the inwardly rolled edge 50 with its stiffener rod 51.

FIG. 3 indicates a pattern that can be used to cut the transparent covering sections 52 and 53. The pattern dimensions are dependent on the final shape of the helix 30 (FIG. 1) and may be tested with a paper board tracing form. Attachment screws or fasteners are located at 54 top, and 55 sides and front.

Final form fabrication of the transparent covering 52 and 53 are shown in FIG. 4 with the novel steep rain, ice and snow angle incline $\theta 1$ clearly visible. The shape of covering 52 and 53 is basically a non-equidistant triangle. Greater strength is attained with the use of polycarbonate as the covering medium versus acrylic, however the optical transmittance is not as acceptable for the polycarbonate as the acrylic, nevertheless it is within usable range. The overlapped edges 56 are fastened with top fasteners 54. The front is attached by fasteners 55 to end piece 43 (FIG. 1) and the back end piece 44 (FIG. 1) is likewise attached by fasteners 55. The upper fasteners 54 may be permanent or removable with a sealant used to waterproof them before installation or the entire top 56 may be solvent welded or attached by other means. The front, back and side fasteners 55 should be removable in order to accommodate occasional removal of covering 52 and 53 for maintenance of the collecting cores 31, 32 and 33 and reflector 30 (FIG. 1). By proper utilization of the transparent covering 52 and 53 heat energy is generated and trapped between the covering and the reflector 30 (FIG. 1) enhancing the collection of energy within the energy absorber collection cores. The covering further prevents heat dissipation to the atmosphere and deters wind chill effects, and inhibits atmospheric pollutant degradation.

An alternative method of construction of the transparent, relatively air-tight covering 52 and 53 as shown in FIG. 2, FIG. 3 and FIG. 4, is to utilize a single sheet of clear vinyl material such as is used to assemble temporary storm windows and the like for homes and buildings. With the addition of a support rod or angle iron, or other material, at the top of overlapped sections 56 of covering halves 52 and 53 as a means of holding the vinyl covering up in the middle. A minor shadow is cast by the aforementioned support. The side edges front and back, where fasteners 53 are utilized to attach the covering to the reflector 30 (FIG. 1), may be affixed by the use of weatherproof high and low temperature clear weather stripping tape or heating duct tape run the entire length of the vinyl edges, side, front and back. The physical shape of the vinyl covering would be in accordance with the shape detailed in FIG. 3 whereby each half 52 and 53 basically forms a non-equidistant triangle. The final shape will depend upon the final selection of the form of the helix reflector 30 (FIG. 1) and its end pieces 43 and 44 (FIG. 1), or the entire transparent covering 52 and 53 may be semi-tubular and composed of any suitable material. FIG. 5 details with the transparent covering 52 and 53 (FIG. 1) removed, one possible specific position of the cores 31, 32, 33 and 90 degree return bends 35, 36, 37, 38 and short section of tubing 39, 40 with one focal axis 57 running down the reflector shell 30. The focal axis 57 is taken at mid-day high apex of the sun. The larger acceptance aperture A at mid-point in the reflector 30 is apparent as this expanded aperture A allows the helix reflector 30 to assume a parabolic form 30 (FIG. 2). The larger acceptance aperture A and parabolic form (FIG. 2) allows a greater intensity of solar rays to impinge on cores 31, 32 and 33. The specifically positioned cores 31, 32, 33 cross at an off angle, the focal axis 57 at mid-day and illustrate how at least one or more of the cores are in the sharp focal axis 57 and thus the solar concentrator is capable of static passive tracking of the sun without active tracking means such as optoelectrical-mechanical systems. Each end piece 44 and 43 is attached by clamps 41 and 42 to the short section of tubing 39 and 40 respectively with a ridgidizing and strengthening result. An improved house, building or other appropriate structure mounting frame of galvanized tubing 58 fabricated and joined to form a continuous rounded corner rectangle is joined to end pieces 44 and 43 by fasteners 59 and 60. This tubing frame 58 in combination with the self support feature of the helix reflector 30 as described in prior claims of U.S. patent application for a CONCAVE HELIX SOLAR CONCENTRATOR, Ser. No. 934,833, filed Aug. 18, 1978, and in a U.S. disclosure document for a CONCAVE HELIX SOLAR CONCENTRATOR, Ser. No. 072,971, filed July 25, 1978, makes the entire device assume excellent structural properties that resist high winds with consistant reliability, and conforms to the device's novelty and ability to be easily manufactured.

Figure 6:
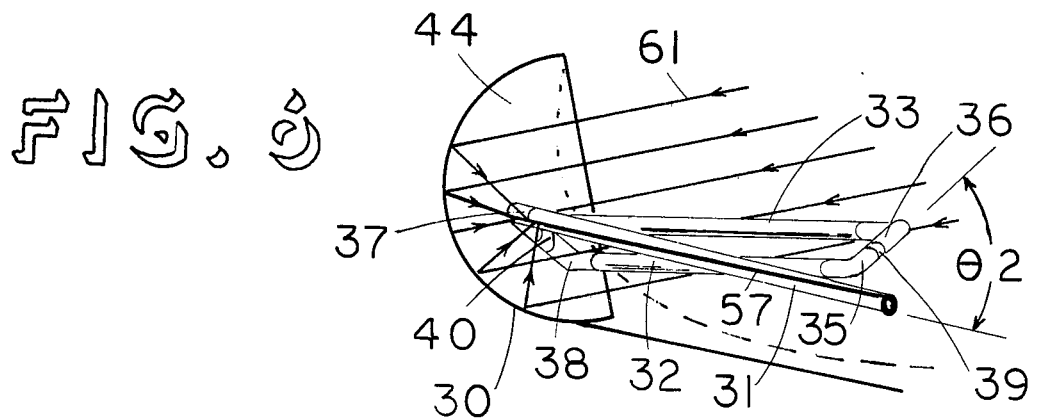
FIG. 6 is an illustration of how the reflector impinges the solar rays on one configuration of the collecting cores.

Referring to FIG. 6 the detail of the improvement can be seen in the invention by its utilization of a plurality of specially positioned cores 31, 32, and 33 and their related return couplings 35, 39, 36, 37, 40, and 38. The heat energy collected through this series configuration is additive. The angle $\theta 2$ is chosen to be somewhat greater than 90 degrees and to be formed in accordance with the shifting sharp focal axis requirements as will be described under FIG. 8 and FIG. 9 respectively. The energy absorber collecting cores 31, 32, and 33 composed of copper, brass, aluminum, steel, or other suitable material are positioned off-angle slightly from the focal axis 57 of the sun's solar rays 61 impinging on the helix reflector 30. It can be seen by this slight off-angle mounting of the cores 31, 32, and 33 on the end piece 44 with return couplings 37, 40, and 38, that the sun wraps or "crawls" around the core 31 with its impinging shifting focal axis 57 giving the cores a much greater exposure to the concentrated solar energy rays than would be possible with only one core positioned in the absolute center of the only focal axis. The prior art single core arrangement provides only a small area or point of sharp focal intensity.

Figure 7:
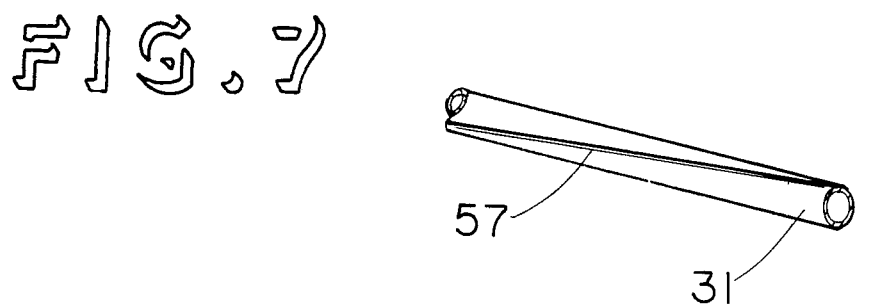
FIG. 7 is an enlarged partial view of one of the collecting cores showing the sharp focal axis plain of the sun partially wrapped around the core.

FIG. 7 is an enlarged partial view of core 31 illustrating the wrap or "crawl" around feature of the focal axis 57 and illustrates the larger collecting capacity of each of the individual cores by the slight off-angle positioning of a plurality of cores versus the focal point collection capacity of an on-angle core.

Figure 8:
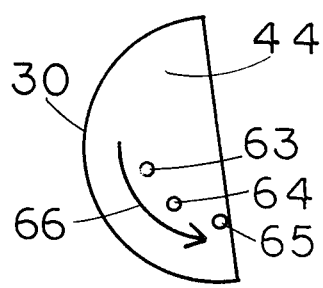
FIGS. 8 and 9 are schematic views indicating the position of the reflector's shifting sharp focal axis during selected times of the day as taken in perspective from either end of the device along lines 8—8 and 9—9 of FIG. 1 respectively.
Figure 9:
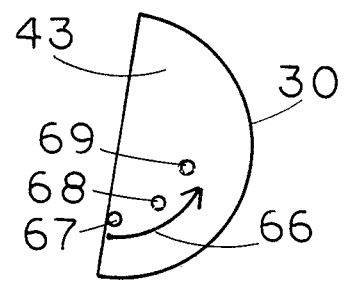

Schematic views FIG. 8 and FIG. 9 are taken looking at the back mounting of end piece 44 (FIG. 8) and the front mounting end piece 43 looking through it (FIG. 9) as if it was transparent. The illustration FIG. 8 indicates three (3) positions of the sun's rays focused by reflector 30 as the sun travels through its solar day. What is illustrated is the sharp impinging of the sun's rays at approximately nine-o'clock a.m. 63, at eleven-o'clock a.m. 64, and one-o'clock p.m. 65. The shifting track 66 is of the sun as it moves while the helix shaped concentrator remains stationary, is thus revealed. The specific positioning of collecting cores 31, 32 and 33 (FIG. 1) fall advantageously along the shifting track 66 and can be specifically positioned at 63, 64 and 65 respectively.

Figure 10:
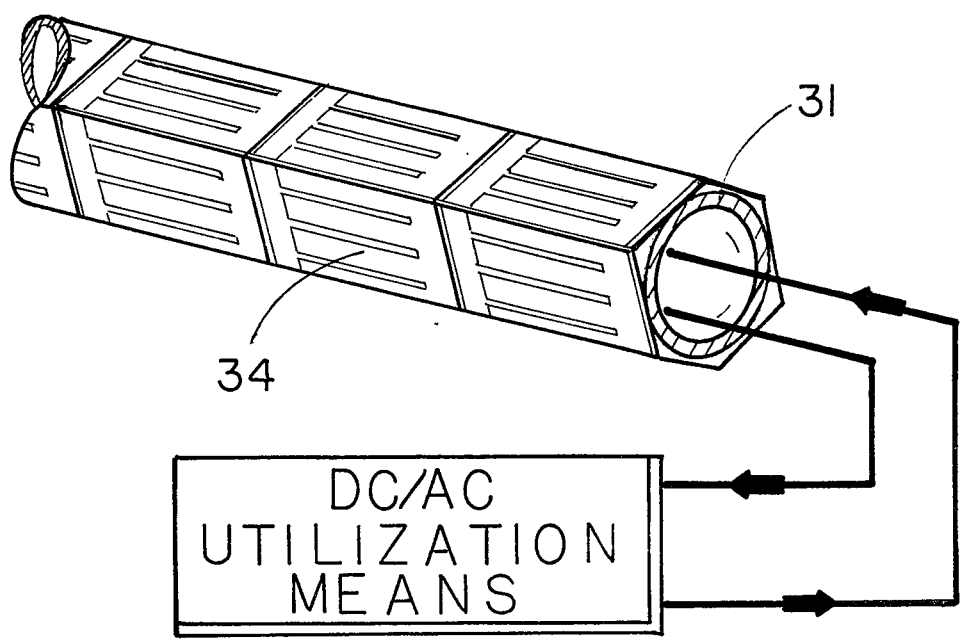
FIG. 10 is an enlarged partial view of one of the collecting cores showing photovoltaic cells positioned along its axis and interconnected to a utilization means.

Referring to FIG. 9 the position of the sun looking through end piece 43, three (3) afternoon positions of the sun's shifting track 66 are illustrated: two-o'clock p.m. 67, four-o'clock p.m. 68 and six-o'clock p.m. 69, indicate possible specific positioning, as aforementioned, of the plurality of collecting cores. Since the end pieces 44 and 43 are canted the cores 31, 32, and 33 (FIG. 1) will be off focal axis slightly as detailed in the prior description. FIG. 10 is an enlarged partial view of core 31 illustrating another embodiment of the invention whereby photovoltaic cells 34 can be attached by high temperature silicone glue to each of the individual cores which are interconnected to a utilization means such as batteries, DC motors, and DC to AC converters, or any other electrical or electronic use.

The novelty and advantages over prior art are apparent in the development of this highly efficient helix shaped solar collector-concentrator capable of tracking the sun's solar radiation passively.

Limitation of the present invention to only those embodiments cited and herein illustrated is not intended, but should encompass any and all ramifications possible as long as they fall within the intent of the aforementioned disclosure and following claims.

The embodiments of the invention in which an exclusive property or privilege is claimed are defined as follows:

1. A passive tracking radiant solar energy collector-concentrator device comprising a helix shaped semi-tubular elongated concave-parabolic reflector, wherein said helix shaped semi-tubular concave-parabolic reflective surfaces have as much as a 360 degree spiral running the length of said helix shaped concave-parabolic reflector, said reflector supported by two end pieces, said end pieces supporting a plurality of energy absorber collecting cores, said collecting cores disposed specifically within the sharp shifting focal axis of said reflector element so that the sun's reflective rays impinge on one or more of said collecting cores at all times during the solar day, said collecting cores being disposed within the primary direct and non-reflective incident solar radiant energy to increase the solar energy collection of said collecting cores, said collecting cores disposed to accommodate a heat exchange medium, said heat exchange medium to receive the energy from said collector cores and absorb said energy for use by a utilization means, said helix shaped semi-tubular concave-parabolic reflector and said collecting cores being enclosed by a transparent covering which when placed over said helix reflector and said collecting cores institutes an atmospheric protector and heat loss inhibitor.

2. A device according to claim 1 wherein said helix shaped concave-parabolic collector-concentrator being disposed to accept up to 179 degree aperture of solar energy passively throughout the solar day without the use of opto-electrical-mechanical tracking devices.

3. A device according to claim 1 wherein said plurality of energy absorber collecting cores are attached to said end pieces and in so attaching are specifically supported within the shifting sharp focal axis of said helix shaped concave-parabolic reflector.

4. A device according to claim 3 wherein one or more said collecting cores being sequentially disposed at different times of the daylight hours within said helix shaped semi-tubular parabolic reflector's said sharp focal axis of said impinging solar radiation, are positioned specifically so as to collect said solar radiation by causing said focal axis to impringe semi-spirally around said collecting cores being disposed at a slight off-angle to said focal axis.

5. A device according to claim 1 wherein said specifically positioned collecting cores are combined to accommodate the passage of a heat exchange medium.

6. A device according to claim 1 wherein said energy absorber collecting cores are composed of photovoltaic cells disposed within said helix shaped concave-parabolic reflector and said heat transfer medium comprises electrical connections made to said utilization means to collect and store the electrical energy created by photoelectric conversion.

7. A device according to claim 1 wherein said reflector being helix shaped is parabolic in formation.

8. A device according to claim 1 wherein said transparent covering is made to be snow, wind, rain, and atmospheric pollutant degradation resistant and attached to said helix shaped concave-parabolic reflector.

9. A device according to claim 1 further comprising an improved apparatus for mounting said radiant solar energy helix shaped concave-parabolic collector-concentrator wherein the improvement comprises a joined and continuous outer tubing frame, said tubing frame is formed into a rounded corner rectangle running the full side and end lengths of said helix shaped reflector and is attached to said helix shaped collector-concentrator and mounting surface.

* * * * *

UNITED STATES PATENT AND TRADEMARK OFFICE
CERTIFICATE OF CORRECTION

PATENT NO. : 4,235,225

DATED : November 25, 1980

INVENTOR(S) : David H. Doebel

It is certified that error appears in the above—identified patent and that said Letters Patent is hereby corrected as shown below:

Column 1, line 11, "of" second occurrence should read -- to --.

Column 1, line 56, after "tioned" delete "of".

Column 5, line 1, "depene-" should read -- depen --.

Column 8, line 35, "impringe" should read -- impinge --.

Signed and Sealed this

Twenty-fourth Day of March 1981

[SEAL]

Attest:

RENE D. TEGTMEYER

Attesting Officer  Acting Commissioner of Patents and Trademarks